Jan. 11, 1955
W. B. WILSON
2,699,256
FRACTIONATION OF MICROPOROUS SOLIDS
Filed May 29, 1953
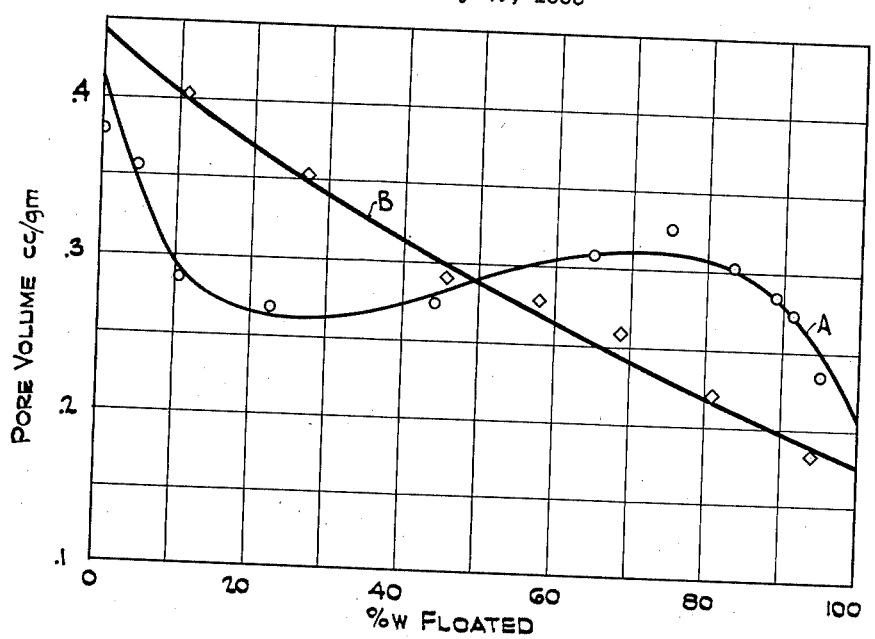
FIGURE II
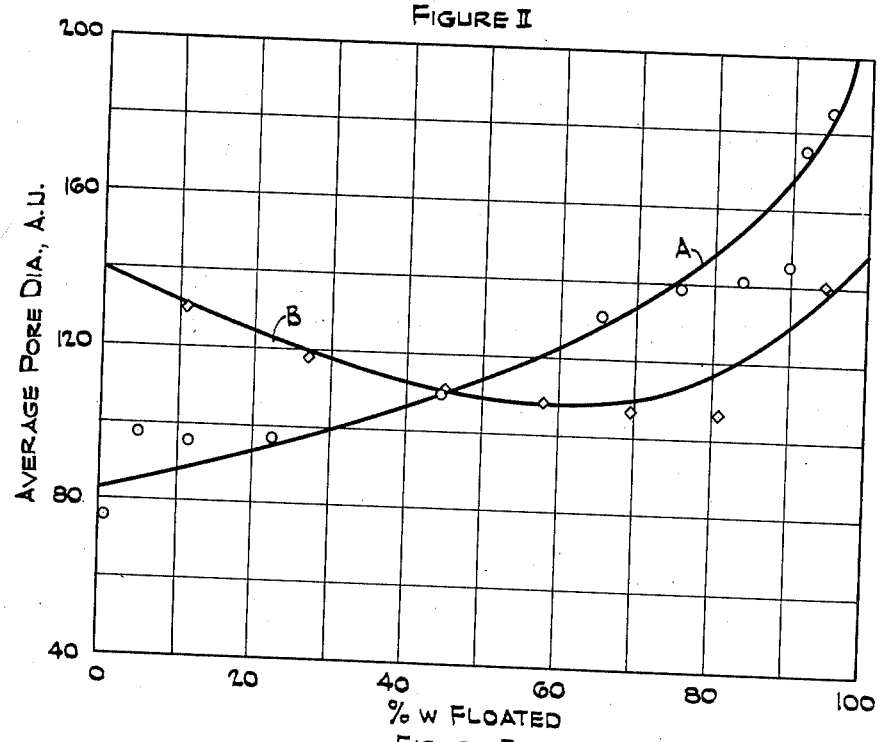
FIGURE I
Inventor:
William B. Wilson
By James Todorovic
His Attorney

United States Patent Office 2,699,256
Patented Jan. 11, 1955

2,699,256

FRACTIONATION OF MICROPOROUS SOLIDS

William B. Wilson, Concord, Calif., assignor to Shell Development Company, Emeryville, Calif., a corporation of Delaware Application May 29, 1953, Serial No. 358,299

7 Claims. (Cl. 209—172)

This invention relates to the separation of microporous solids into fractions having different properties through the use of partition liquids. It relates especially to the separation of microporous catalyst particles into fractions having different pore size distribution.

The separation of galena from quartz, coal dust from slate, and other such mixtures with a partition liquid by the sink-float technique, sometimes called "heavy media separation" (HMS), is old and has been widely used. In these instances the separation is effected on the basis of different densities of the material of which the particles are constituted. The particles are generally non-porous and any porosity, if it exists, does not affect the separation. When the materials composing the particles have the same density, this method fails.

Particles having the same or nearly the same skeletal densities may, however, be separated into fractions having different properties when the particles have different microporous structures, and such separation or fractionation is often of practical value. Thus, for example, Peery et al.—U. S. 2,556,483 have shown how it is possible to separate certain mixtures of materials which could otherwise not be separated by imparting microporosity to the particles and then separating into fractions on the basis of differences in the surface areas.

Rampino—U. S. 2,508,867, has shown that microporous particles, even when having the same density, available surface, and porosity, may be separated into fractions having different properties on the basis of different rates of sorption. The different rates of sorption upon which the separation is effected are due to cracks which are not detected or reflected in the usual physical measurements.

While such separations are important for the separation of various mixtures in various fields, they are particularly important for separating various microporous contact agents such as catalysts, adsorbents, exchange bodies, and the like. Thus, Hatton et al.—U. S. 2,430,015, describe a catalytic cracking process in which so-called equilibrium cracking catalyst which consists of a mixture of particles of essentially the same skeletal density but different catalytic activities may be continuously separated into more and less active fractions through an electrostatic separation technique. This separation is based on differences in the surface area.

The separation of catalyst on the basis of differences in pore volumes (porosity) using a sink-float liquid is described in Peery—U. S. 2,631,968. The particles of fresh catalyst supplied in the cracking process are all essentially the same. They all have the same skeleton density, a high and substantially uniform pore volume, and a large surface of several hundred square meters per gram. During use in the process, the skeletal density remains essentially unchanged but the particles shrink in size. The apparent density of the particles (particle density), therefore, increases with time of use. Since the catalyst in use is essentially continuously replenished with fresh catalyst, the catalyst as found in the catalytic cracking reactor is, therefore, a mixture of relatively fresh, less dense and more active particles and older, more dense, and less active particles. Since the shrinking of the particles which leads to the increased particle density reduces the pore volume, it is seen that the separation is effected on the basis of differences in pore volume.

If the mixture of particles is simply suspended in a partition liquid which penetrates the pores, the separation would be based on skeletal density but, since the skeletal density is the same, no separation would be expected. In practice, however, it is noted that a few of the pores are closed during the shrinkage and these trapped pores make the particle behave as if it has a slightly lower ekeletal density. Consequently, when a partition liquid of suitable density is chosen, a small fraction of particles having high particle density (but slightly lower apparent skeletal density) float, whereas those having the lower particle density sink, and separation of the particles having open pores from particles having trapped pores may be effected. If, on the other hand, a partition liquid is chosen which does not penetrate and fill the pores or, if the particles are treated first to prevent the partition liquid from entering the pores, a separation may be effected based on particle density differences or, in other words, on differences in total pore volume.

Plucknett, Serial No. 746,157, filed May 5, 1947, now abandoned, describes a useful variation of the technique as applied, for example, to the separation of equilibrium cracking catalyst. In this method, the pores of the particles are first filled completely with a light liquid, such as water, and then the separation is effected with a second more dense partition liquid which is immiscible with the water. This is a convenient way to seal the pores against entrance of the partition liquid. The separation is as before on the basis of apparent density of the particles or, in other words, on the basis of differences in total pore volume.

I have now found that by varying the technique such mixtures of particles having the same skeletal density may be separated into fractions, not on the basis of the pore volume or surface, but on the basis of differences in the pore size distribution of the particles: that is, on the basis of the average diameters of pores in the particles. It will be appreciated, that two particles having the same skeletal density and total pore volume and, therefore, the same particle density, may have their pore volumes made up of pores of vastly different size. The average size of the pores, expressed in terms of average pore diameter, affects the availability of the surface to molecules of different size and is an important property of such contact agents. It will be apparent, therefore, that a process which allows separation of mixtures of such particles having similar skeletal densities into fractions having pores of relatively small and relatively large diameters is useful. This separation is quite distinct from and fundamentally different than separation into fractions on the basis of apparent density or on the basis of surface area.

According to the present invention, microporous solid particles having the same or essentially the same skeletal density but different pore structures are separated into fractions on the basis of different average size of the pores, i. e., average pore diameter. This separation depends upon the fact that the vapor pressures of liquids are depressed in wetted capillaries. Thus, if a liquid which wets the solid is supplied in a small amount insufficient to fill all the pores, the liquid fills the smallest pores preferentially and then, if more liquid is added, larger and larger pores are filled until finally all of the pores are filled. During this sequence of steps, the vapor pressure of the mixture increases until when all the pores are filled the vapor pressure equals that of the pure liquid. Thus, by first only partially saturating with a suitable liquid, and then putting the partially saturated particles in a partition liquid of suitable density, the particles are separated into two fractions, one of which tends to float and the other of which tends to sink. The direction the particles take depends upon the density of the liquid used to partially saturate the pores. If this liquid is lighter than the partition liquid, the fraction which tends to float consists of the particles having the smallest average pore diameter. If the liquid used to partially saturate the pores is heavier than the partition liquid, the particles having the larger average pore diameter tend to float.

The present invention is applicable for the separation of any particulate solid material which is made up of particles having micropores of different average size, similar skeletal density, and which are sufficiently inert chemically to allow the separation without appreciable reaction or solution. Thus, the process is well suited for the separation of various solid microporous catalysts, e. g., cracking catalyst, adsorbents, e. g., silica gel, and the like. By microporous, I means having an appreciable pore volume, e. g., at least 0.1 cc. per gram, made up of micropores. The pores in such materials as activated carbon, silica gel, activated alumina, silica-alumina cracking catalyst, silica-magnesia cracking catalyst, silica-alumina-zirconia cracking catalyst, silica-alumin-boria cracking catalyst, alumina-boria cracking catalyst, aluminum fluoride-alumina cracking catalyst, are generally of average diameter between about 10 and 400 Angstrom units. Such materials as diatomaceous earth, certain ceramic materials, and the like, may have average pore diameters as high as about 3,000 Angstrom units.

If the chemical composition of the particles is the same, they have the same skeletal density. This skeletal density is the density usually given in handbooks, and refers to the density of the pure, non-porous solid of which the particle cell walls are composed. For example, the skeletal density of silica (quartz) and alumina (gibbsite) are 2.651 and 2.423, respectively. It is, however, not essential that the skeletal densities of the particles be absolutely the same. The skeletal densities of the particles should, however, be sufficiently close, taking into account the porosity and the differences in the average pore diameter, that the skeletal density difference does not overshadow the differences in densities of the particles when the smaller pores are selectively filled with liquid. A reasonable separation can generally be effected when the skeletal densities vary up to about 0.1 grams per cc. It is thus possible to effect separation between particles having different chemical composition. For example, cracking catalyst containing boria generally lose some boria by volatilization during use. The change in the skeletal density caused by this loss is, however, not large enough to prevent a practical separation on the basis of average pore diameter. Also, mixtures of synthetic silica-alumina cracking catalyst and activated clay cracking catalyst can be separated on the basis of average pore diameter.

The liquid used to partially saturate the pores of the mixture of particles may be any liquid which can be handled conveniently, wets the particles and does not react with or dissolve the particles. The chosen liquid is preferably immiscible with the partition liquid to be used. For most applications, water is the preferred liquid.

It will be apparent that in the present process, the split between the fractions separated depends upon the amount of the first liquid, e. g., water applied and that it is essential that the amount applied be limited to fill only a portion of the pores. If all of the pores are filled, the separation is effected on the basis of total pore volume rather than average pore diameter which is a quite different fractionation. If only a little of the first liquid is applied, only the particles having the pore volume, made up almost entirely of very small pores will tend to float. As more of the first liquid is applied, the floated fraction includes those particles having larger average pore diameter. In general, the best separations are made when the amount of the first liquid is between 20% and 80% of that required to fill all of the pores.

The water or other first liquid may be incorporated in various ways. One suitable method is to add the desired calculated amount to the particles and then thoroughly mix the material so that the equilibrium distribution of the liquid in the pores is established. On the other hand, the pores may be completely filled and then the liquid may be slowly evaporated with stirring until the vapor pressure of the liquid corresponds to the desired cut point in regard to average pore diameter. In either case it is desirable to allow the mixture to age for a time, e. g., an hour or more to insure equilibrium distribution of the liquid.

After the pores up to any desired intermediate size have been filled with the first liquid which is generally water, the particles are placed in a partition liquid of suitable density to effect the fractionation. The partition liquid penetrates and fills the remaining larger pores and hence these pores exert no buoyance. The particles having the larger average pore diameter, therefore, sink, whereas those having the smaller pores are buoyed up by the lighter liquid which fills the smaller pores selectively.

The partition liquid may be made up of any one or a mixture of the partition liquids commonly used for the separation of minerals having different densities. The density of the partition liquid may be adjusted as accurately as desired by choosing two or more liquids which bracket the desired density and then mixing them in the proper proportions. The hydrocarbons and their halogenated derivatives are generally used but other partition liquids can also be used. For example, it is also possible to utilize liquids weighted with very fine powders, e. g., 0.4 micron barium sulfate, lead sulfide, etc.

While the process is eminently suited for separating particles having all pores of a small size from particles having all pores of a larger size, all other physical properties being essentially the same, such mixtures of particles are not generally encountered. In the usual case, all of the particles have at least some pores of various sizes. The first liquid, e. g., water, therefore, is distributed among all of the particles in proportion to the number of fine pores the particles contain. Thus, when any given amount of the first liquid is applied, e. g., equivalent to 50% of the total pore volume, it is selectively absorbed in pores below a given diameter, e. g., 50 Angstrom units. Then, if the mixture is fractionated in separate portions of partition liquids of increasing density, a series of fractions may be separated. The pore volume of the first lighter fraction will be made up almost entirely, e. g., 95%, of pores having a diameter of 50 Angstrom units or less. The second 90%, the third 85%, and so on while the heavier fractions will consist of particles having fewer and fewer pores in the 50 Angstrom units or less range. Therefore, it is not only possible to choose the desired maximum pore size on which the fractionation is to be based, e. g., 50 Angstrom units by control of the amount of the first liquid used, but it is also possible to choose the desired purity of the separated fractions by adjustment of the density of the partition liquid to separate any desired percentage of the total solid as the lighter (floated) fraction.

The suspension of the mixture of particles having the finer pores selectively filled with the first liquid and the remaining pores filled with the partition liquid may be placed in a column provided with means for separately withdrawing, e. g., by skimming the floated particles from the top and the sunken particles from the bottom. On the other hand, the separation may be hastened by passing the suspension through a suitable centrifuge. Also, the separation may be hastened by pumping the suspension through a hydrocyclone (e. g., a separator of the type known by the trade-mark "Hydroclon") which is similar to the conventional cyclone dust separator but is designed to handle liquids instead of gases. (See, for example, British Patent No. 666,801.) By using a centrifuge, I have been able to effect the separation continuously.

The above described fractionation method will be further illustrated in the following examples which also demonstrate the fundamental differences between the method and the previously described methods which effect separation on the basis of pore volume rather than average pore diameter. In these examples, the separation methods were applied to the fractionation of a so-called equilibrium synthetic silica-alumina cracking catalyst. This cracking catalyst in the form of a fine powder was used in a cracking operation in which the activity of the catalyst was retained essentially constant by replenishment with fresh catalyst. The catalyst was, therefore, made up of particles of various sizes as well as various apparent particle densities (pore volume) and pore size distribution. The properties of the equilibrium catalyst were as follows:

| | |
|---|---|
| Surface area_____m.²/g.__ | 98 |
| Carbon content_____per cent__ | 0.28 |
| Pore volume_____cc./g.__ | 0.301 |
| Average pore radius_____Angstrom units__ | 62 |
| Average particle density_____g./cc.__ | 1.34 |
| Average skeletal density_____g./cc.__ | 2.34 |

Water was used as the first liquid and mixtures of carbon tetrachloride with ethylene dibromide were used as the partition liquid. The partition liquid was first saturated with water. In making the separations, the powder was suspended in a partition liquid of known density and the resulting lighter fraction (floated fraction) was separated in a solid basket centrifuge. The heavier fraction (sunken fraction) was then resuspended in a second partition liquid of slightly higher density and the separation repeated to recover a second floated fraction; this procedure was repeated. The properties of the separately recovered floated fractions were then determined.

In one case, employing the principle of the invention, the separation was carried out on the basis of average pore diameter. In this particular case, the amount of water added was about 59% of the amount required to fill the pores. The water was added to the dry powdered catalyst and the mixture was thoroughly mixed in a closed vessel overnight to allow the water to migrate selectively to the smaller pores. The separation was then carried out as just described. The curve A in the graph illustrated in Figure I of the accompanying drawing shows the average pore diameters of the fractions plotted against the per cent of the material floated. It will be seen that the first material separated had an average pore diameter of 96 Angstrom units and that the average pore diameters of the floated fractions steadily increased as the amount of floated material was increased by increasing the density of the partition liquid.

In a second case, the separation was effected on the basis of pore volume (i. e., porosity) according to the prior art method. In this case, the pores were filled with water in which condition the catalyst contained 25.4% water and then the separation was carried out as before with partition liquids of increasing density. The average pore diameter of the fractions as a function of the per cent material floated for this case is plotted in the graph of Figure I as curve B. It can be readily seen that in this case the separation is not based on the average pore diameter.

The fundamental difference between the two operations is also clearly evident from the graph illustrated in Figure II of the accompanying drawing wherein the pore volumes are shown as a function of the per cent of material floated. The curve B shows the pore volumes of the separated fractions according to the latter or prior art method. It is readily seen that the separation is effected on the basis of pore volume or, in other words, particle density. That the process of the present invention does not separate on the basis of pore volume is clearly seen from curve A which shows the pore volumes of the floated fractions as a function of the per cent of floated material.

I claim as my invention:

1. The method for fractionating mixtures of particles of microporous solids having essentially the same skeletal densities but different pore size distributions into fractions having their pore volumes made up predominantly of smaller and larger pores, respectively, which comprises combining with a mixture of such particles an amount of a first wetting liquid insufficient to fill all the pores whereby said liquid is selectively taken up in the smaller pores, placing the resulting partially saturated particles in a second liquid of density sufficient to float a portion of said particles and separately collecting the floated particles, which separately collected particles constitute a fraction of the original mixture in which the pore volume is composed to a greater extent of pores of different average diameter than in the remaining unfloated fraction.

2. The method for fractionating mixtures of particles of microporous solids having essentially the same skeletal densities but different pore size distributions into fractions having their pore volumes made up predominantly of smaller and larger pores, respectively, which comprises combining with a mixture of such particles an amount of a first wetting liquid between 20% and 80% of that required to fill all the pores whereby said liquid is selectively taken up in the smaller pores, placing the resulting partially saturated particles in a second liquid of density sufficient to float a portion of said particles and separately collecting the floated particles, which separately collected particles constitute a fraction of the original mixture in which the pore volume is composed to a greater extent of pores of different average diameter than in the remaining unfloated fraction.

3. The method according to claim 1 further characterized in that said first liquid is a liquid of lower density than said second liquid.

4. The method according to claim 1 further characterized in that the said second liquid is substantially immiscible with said first liquid.

5. The method according to claim 1 further characterized in that said first liquid is water.

6. The method according to claim 1 further characterized in that said first liquid is combined by stirring the required amount of the liquid into the particles and then allowing the mixture to stand for at least two hours to allow the mixture to come to equilibrium.

7. The method according to claim 1 further characterized in that said first liquid is combined by incorporating with the particles an amount at least sufficient to fill all the pores and then evaporating liquid from the mixture until liquid remains only in the smaller of the pores.

References Cited in the file of this patent

UNITED STATES PATENTS

| 2,483,372 | Payne | Sept. 27, 1949 |
| 2,631,968 | Peery | Mar. 17, 1953 |
| 2,643,215 | Hoge | June 23, 1953 |